US009227271B2

United States Patent
Kushiyama et al.

(10) Patent No.: US 9,227,271 B2
(45) Date of Patent: Jan. 5, 2016

(54) THIN PLATE-REINFORCEMENT STRUCTURE UTILIZING REINFORCING EFFECT OF WELD BEAD AND METHOD OF PRODUCING THE SAME

(75) Inventors: Toshiya Kushiyama, Fuchu-cho (JP); Eiji Sugimoto, Fuchu-cho (JP)

(73) Assignee: Delta Kogyo Co., Ltd (JP)

( * ) Notice: Subject to any disclaimer, the term of this patent is extended or adjusted under 35 U.S.C. 154(b) by 653 days.

(21) Appl. No.: 13/527,719

(22) Filed: Jun. 20, 2012

(65) Prior Publication Data

US 2012/0325780 A1 Dec. 27, 2012

(30) Foreign Application Priority Data

Jun. 22, 2011 (JP) .................................. 2011-138278
Feb. 29, 2012 (JP) .................................. 2012-043325

(51) Int. Cl.
*B23K 31/02* (2006.01)
*B23K 9/02* (2006.01)
*B60N 2/68* (2006.01)
(Continued)

(52) U.S. Cl.
CPC ............... *B23K 31/02* (2013.01); *B23K 9/0026* (2013.01); *B23K 9/0043* (2013.01); *B60N 2/20* (2013.01); *B60N 2/68* (2013.01); *B60N 2/682* (2013.01); *B23K 2201/006* (2013.01)

(58) Field of Classification Search
CPC ............ B23K 2201/006; B23K 31/02; B23K 9/0043; B23K 26/24; B23K 26/26; B23K 9/0026; B23K 9/035; B23K 9/02; B23K 9/025; B23K 9/0256; B23K 9/028; B60N 2/68; B60N 2/20; B60N 2/682
See application file for complete search history.

(56) References Cited

U.S. PATENT DOCUMENTS

2007/0040001 A1* 2/2007 Ishikawa et al. ............... 228/101
2009/0072601 A1* 3/2009 Geisler et al. ............ 219/121.64
2010/0219674 A1* 9/2010 Sakkinen et al. ......... 297/452.18
(Continued)

FOREIGN PATENT DOCUMENTS

CN 101417703 4/2009
JP S5114844 2/1976
(Continued)

OTHER PUBLICATIONS

Machine translation of Japan Patent No. 8-019,860, Dec. 2014.*
(Continued)

*Primary Examiner* — Geoffrey S Evans
(74) *Attorney, Agent, or Firm* — Gerald E. Hespos; Michael J. Porco; Matthew T. Hespos (57) ABSTRACT

A vibration mode control method for a thin plate-reinforcement structure utilizes a reinforcing effect of a weld bead, wherein the thin plate-reinforcement structure comprises two welded components at least one of which includes a thin plate portion. After a first (thin plate) component and a second (another) component are arc-welded discontinuously at several positions, a stress direction and level in one of the resulting weld areas located to be subject to stress concentration is preliminarily verified. Then, a stress-dispersing weld bead (f) is laid to extend between the weld area which is an area subject to stress concentration and the first (thin plate) component, wherein the stress-dispersing weld bead (f) is set to a direction and length capable of preventing fatigue crack from occurring in the first (thin plate) component.

11 Claims, 10 Drawing Sheets

(51) Int. Cl.
*B23K 9/00* (2006.01)
*B60N 2/20* (2006.01)

(56) References Cited

U.S. PATENT DOCUMENTS

| 2010/0314928 | A1* | 12/2010 | Loreau | 219/121.64 |
| 2011/0272992 | A1* | 11/2011 | Ferenc et al. | 297/452.18 |
| 2014/0232164 | A1 | 8/2014 | Sakkinen et al. | |

FOREIGN PATENT DOCUMENTS

| JP | S5514844 | | 5/1976 |
| JP | 62-254973 | | 11/1987 |
| JP | 62-259676 | | 11/1987 |
| JP | 08-19860 A | * | 1/1996 |
| JP | 8-155635 | | 6/1996 |
| JP | 09039829 | | 2/1997 |
| JP | 09039829 | | 10/1997 |
| JP | 2003-103365 | | 4/2003 |
| JP | 2003-251489 A | * | 9/2003 |
| JP | 2004-98114 A | * | 4/2004 |
| JP | 2004-232052 A | * | 8/2004 |
| JP | 2008050807 | | 3/2008 |
| JP | 2008050807 | | 6/2008 |
| JP | 2009-61482 A | * | 3/2009 |
| WO | WO-2008/131228 A2 | * | 10/2008 |

OTHER PUBLICATIONS

Machine translation of Japan Patent No. 2003-251,489, Dec. 2014.*
Machine translation of Japan Patent No. 2004-98,114, Dec. 2014.*
Machine translation of Japan Patent No. 2009-61,482, Dec. 2014.*
Machine translation of Japan Patent No. 2004-232,052, Dec. 2014.*
Chinese Patent Appl. No. 201210209068.1—Chinese Office Action issued Apr. 8, 2015.

* cited by examiner

THIN PLATE-REINFORCEMENT STRUCTURE UTILIZING REINFORCING EFFECT OF WELD BEAD AND METHOD OF PRODUCING THE SAME

BACKGROUND OF THE INVENTION

1. Field of the Invention

The present invention relates to a thin plate-reinforcement structure utilizing a stiffening or reinforcing effect of a weld bead, and a method of producing the thin plate-reinforcement structure.

2. Description of the Related Art

Figure 10A:
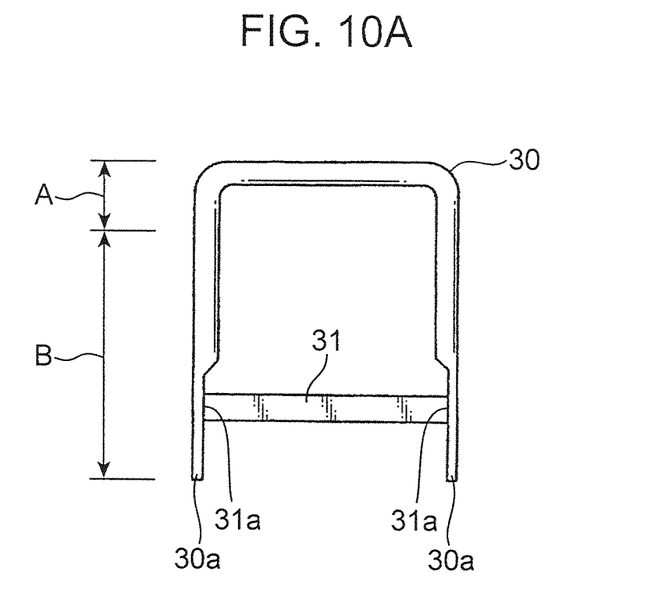
FIG. 10A is a front view of the welded structure.
Figure 10B:
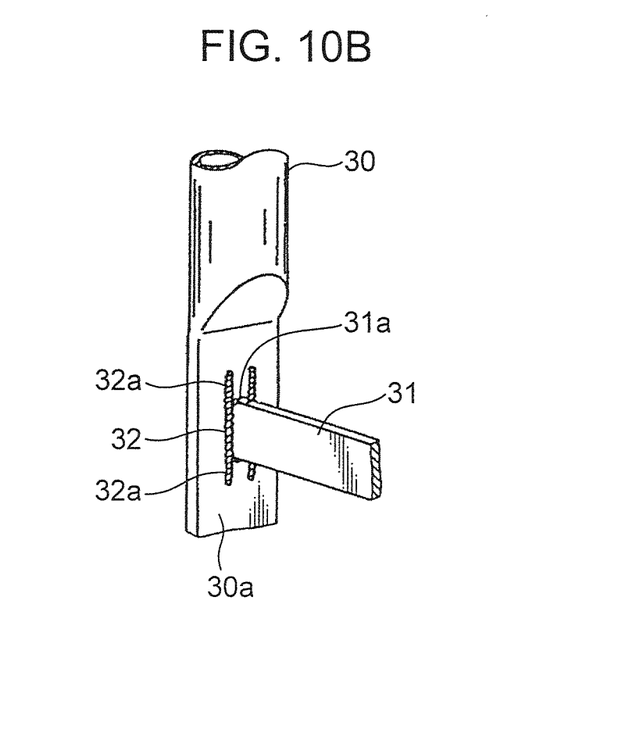
FIG. 10B is a perspective view of a welded portion between a planar portion of the pipe frame and the lower frame.

Heretofore, as illustrated in FIGS. 10A and 10B, there has been known a welded structure, for example, for a seat back of an automobile seat, in which right and left end faces 31a of a lower frame 31 are bridgingly arc-welded, respectively, to right and left planar portions 30a of a pipe frame 30, wherein a continuous weld bead 32 to be provided along an upwardly and downwardly extending edge of each of the end faces 31a of the lower frame 31 is formed to additionally extend onto a respective one of the planar portions 30a of the pipe frame 30 (see JP 62-259676A: hereinafter referred to as Patent Document 1).

The reason for providing an extension portion 32a to the weld bead 32 is to give a reinforcing function equivalent to a boss or a rib to a welded connection area, thereby preventing deformation in the planar portion 30a and the lower frame 31, and fatigue crack which would otherwise be caused by the deformation.

The planar portions 30a of the pipe frame 30 in the Patent Document 1 are formed by flattening respective opposite lower ends of the pipe frame 30. The pipe frame 30 has been commonly prepared using a pipe having a wall thickness of about 1.5 mm. Thus, it can be said that the planar portion 30a is composed of two superimposed plates each having a thickness of about 1.5 mm. The lower frame 31 has also been commonly prepared using a plate having a thickness of about 1.5 mm.

As a seat back frame, such a plate having a thickness of about 1.5 mm belongs to the category of "thick plate".

Meanwhile, in late years, as applied to FIG. 10A, a back seat frame 30 has been employed which comprises a pipe frame provided in the upper range A, and a side frame provided in the lower range B, wherein the side frame is prepared as a press-formed product and welded to a lower end of the pipe frame.

With a view to facilitating a reduction in weight of the side frame, a press-formed product is employed which is prepared by superimposing two plates each having a thickness of about 0.5 mm, and reinforcing the superimposed plates by a concavoconvex rib configuration. Similarly, with a view to facilitating a reduction in weight of the lower frame 31, a press-formed product is employed which is prepared by reinforcing a plate having a thickness of about 0.5 mm, by a concavoconvex rib configuration.

As a seat back frame, such a plate having a thickness of about 0.5 mm belongs to the category of "thin plate". Further, as in an aftermentioned embodiment, there is a seat cushion in which a side frame of a cushion frame is formed using a "thick plate", and a cushion pan is formed using a "thin plate".

Thus, in the case where an extension portion 32a of a weld bead 32 is provided during welding between two thick plates as in the Patent Document 1, a direction and length of the extension portion of the weld bead 32 do not matter as much, as long as the extension portion can give a reinforcing function equivalent to a boss or a rib to a welded connection area.

For this reason, the Patent Document 1 simply mentions that: the weld bead 32 is formed to additionally extend along an upwardly and downwardly extending edge of the end face 31a of the lower frame 31, as to the direction of the extension portion 32a of the weld bead 32; and the weld bead may additionally extend only by a small length (about 15 mm), as to the length of the extension portion 32a.

SUMMARY OF THE INVENTION

However, in an operation of welding a component (e.g., lower frame (reinforcing member)) to a thin plate component (e.g., side frame) having a thickness of about 0.5 mm, it is often the case that they are spot-welded discontinuously at about several positions. In this situation, stress concentration does not occur in all of the resulting discontinuous weld areas, but it is more likely to occur in specific one or more of the weld areas, causing fatigue crack. Thus, it is effective to determine in which of the weld areas stress concentration occurs, and apply, to the determined weld area, a countermeasure for suppressing the occurrence of fatigue crack.

For this purpose, it is effective to employ arc-welding having high flexibility in setting of weld position and length, instead of employing spot-welding having restrictions on weld position and length and difficulty in setting of stress dispersion.

The present invention has been made based on the above findings, and an object thereof is to provide a thin plate-reinforcement structure utilizing a reinforcing effect of a weld bead, which is capable of effectively achieving prevention of the occurrence of fatigue crack in a thin plate component, or delay in an occurrence timing of the fatigue crack, almost without causing an increase in cost and weight, and a method of producing the thin plate-reinforcement structure.

In order to solve the above object, according to one aspect of the present invention, there is provided a method of producing a thin plate-reinforcement structure utilizing a reinforcing effect of a weld bead. The method comprises: a first step of preparing a first component including a thin plate portion, and a second component having a thickness greater than that of the thin plate portion; and a second step of welding the first component and the second component together. The second step includes the sub-steps of: welding the first component and the second component together through at least one weld area; and providing a stress-dispersing weld bead to extend from an overlapping region between the weld area and the first component, onto the first component or the second component, wherein the stress-dispersing weld bead is set to a direction and length capable of preventing fatigue crack from occurring in the first component.

In the present invention, during an operation of welding a thin plate component (hereinafter referred to also as "first component") and another component (hereinafter also referred to as "second component"), the stress-dispersing weld bead is provided to extend from an overlapping region between a weld area, subject to stress concentration and the thin plate component (first component), onto the first or second component. This makes it possible to effectively achieve prevention of the occurrence of fatigue crack in the thin plate component, or delay in an occurrence timing of the fatigue crack.

In addition, the stress-dispersing weld bead can be laid, following the operation process of welding, to the thin plate component (first component), another component (second component). Thus, the operation process of laying the stress-dispersing weld bead falls within the range of a usual welding operation process and requires no special technique, so that there is almost no increase in cost. Furthermore, it is only necessary to simply lay the stress-dispersing weld bead, so that there is almost no increase in weight of a welded structure.

These and other objects, features, and advantages of the present invention will become apparent upon reading of the following detailed description along with the accompanying drawings.

BRIEF DESCRIPTION OF THE DRAWINGS

FIGS. 3A and 3B illustrate a welded structure between an upper bracket and a spring-retaining bracket, according to a first embodiment of the present invention, wherein

FIGS. 5A and 5B illustrate a conventional welded structure between an upper bracket and a reinforcing member, wherein

FIGS. 6A and 6B illustrate a welded structure between an upper bracket and a reinforcing member, according to a second embodiment of the present invention, wherein

FIGS. 8A and 8B illustrate a welded structure between a side frame and a cushion pan, according to a third embodiment of the present invention, wherein

FIG. 10 illustrates a welded structure between a pipe frame and a lower frame, described in Patent Document 1 (JP 62-259676A), wherein

DETAILED DESCRIPTION OF INVENTION

Figure 1:
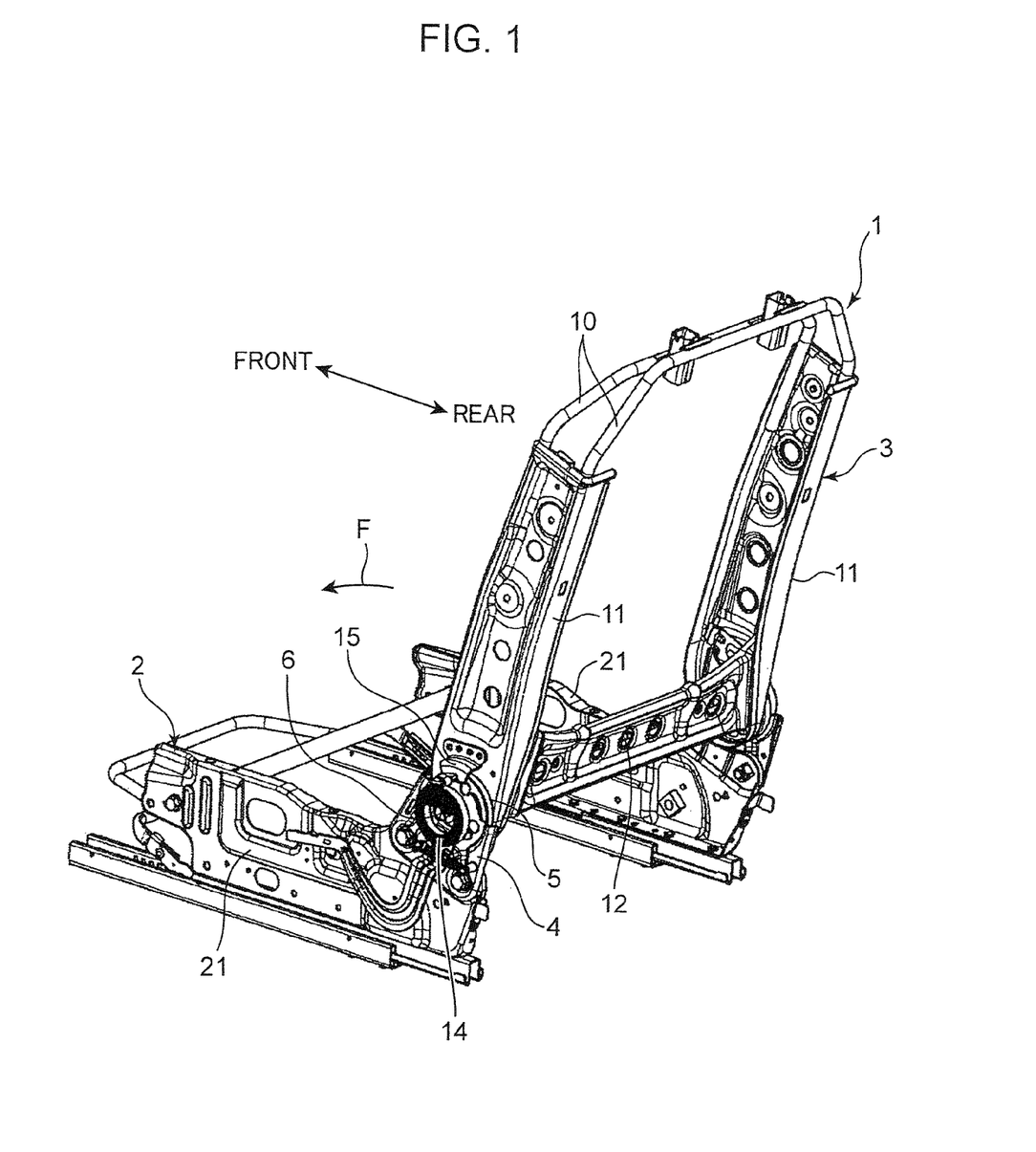
FIG. 1 is a perspective view of a frame structure to be installed inside an automobile seat, when viewed obliquely forwardly from a rear side thereof.

With reference to the drawings, the present invention will be described in detail, based on embodiments thereof. FIG. 1 is a perspective view of a frame structure 1 to be installed inside an automobile seat, when viewed obliquely forwardly from a rear side thereof.

The frame structure 1 comprises a cushion frame 2 to be installed inside a seat cushion, and a back frame 3 to be installed inside of a seat back.

The back frame 3 has an upper bracket 5 formed as a part of a lower portion thereof, and the cushion frame 2 has a lower bracket 4 formed as a part of a rear portion thereof. The upper bracket 5 is superimposed on an inner side of the lower bracket 4, and coupled to the lower bracket 4 by a reclining shaft 6 (see FIG. 2). This allows the back frame 3 to be tilted in a forward-rearward direction with respect to the cushion frame 2.

The back frame 3 comprises an upper section composed of two pipes 10, a side section composed of right and left side frames 11 each having an upper portion arc-welded to a respective one of right and left lower ends of the upper section, and a bottom section composed of a reinforcing member 12 bridgingly arc-welded to respective lower portions of the right and left side frames 11.

Each of the side frames 11 and the reinforcing member 12 is a press-formed product reinforced by a concavoconvex rib configuration. In particular, as illustrated in FIG. 4B, each of the side frames 11 is prepared by superimposing two plates (an inner panel 11a and an outer panel 11b) each having a thickness of about 0.5 mm. As illustrated FIG. 6B, the inner panel 11a is formed such that an end 11c thereof wraps and clamps an outer surface of an end 11d of the outer panel 11b to provide more strongly reinforced frame structure. In a welded structure according to a first embodiment of the present invention, the side frame 11 (upper bracket 5) falls into the concept of the term "thin plate component (thin metal component)".

Figure 2:
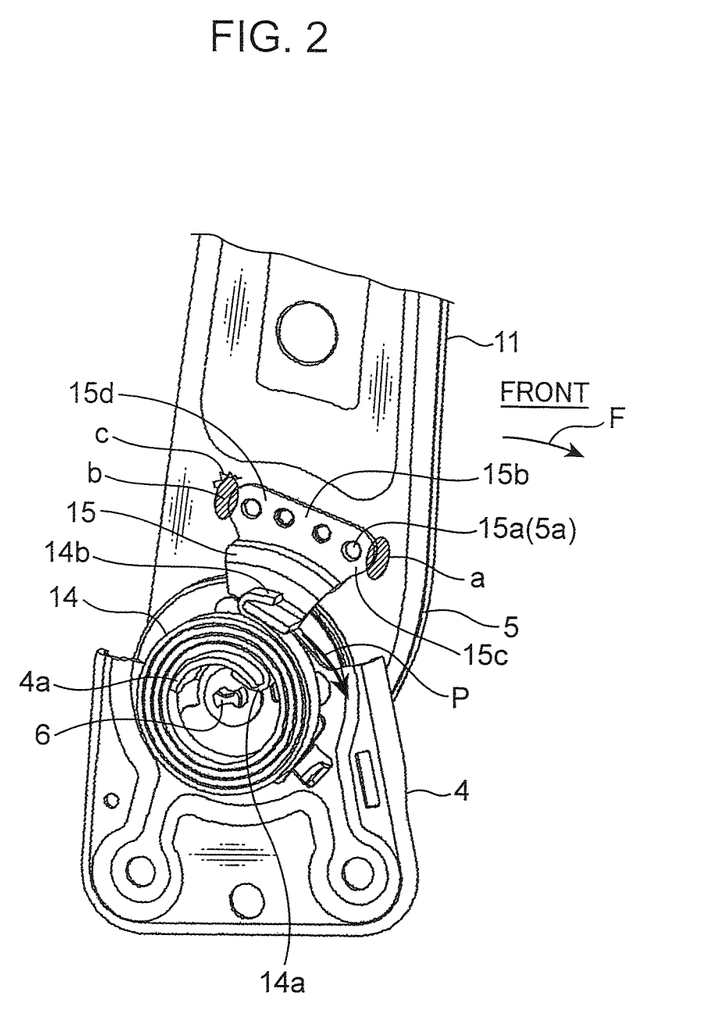
FIG. 2 is a perspective view of a conventional welded structure between an upper bracket and a spring-retaining bracket.
Figure 3A:
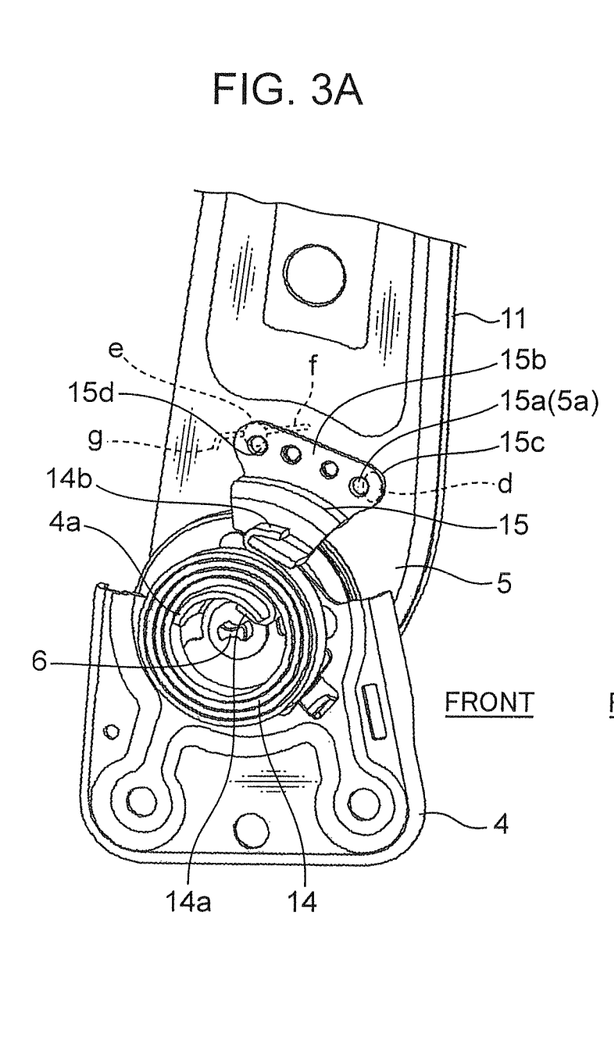
FIG. 3A is a perspective view of an obverse-side welded structure.
Figure 3B:
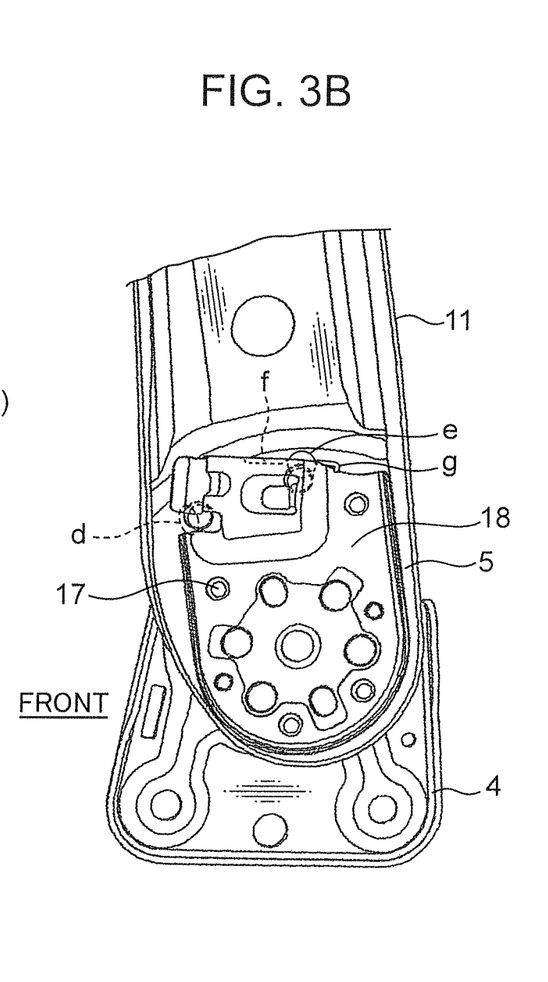
FIG. 3B is a perspective view of a reverse-side welded structure.

As illustrated in FIG. 2, a spiral spring 14 is provided in concentric relation to the reclining shaft 6 to bias the back frame 3 in a forward direction F so as to allow the back frame 3 to be tilted forwardly. The spiral spring 14 has an inner end 14a locked by a spring-retaining portion 4a of the lower bracket 4, and an outer end 14b locked by a spring-retaining bracket 15 arc-welded to the upper bracket 5. In the first embodiment, the spring-retaining bracket 15 falls into the concept of the term "another component (another metal component)".

The terms "thin plate component" and "another component" are recited, respectively, as "first component" and "second component" in the appended claims. In this connection, it should be noted that, as used in this specification, the term "thin plate component (first component)" does not mean the entirety thereof essentially has a thickness less than that of "another component (second component)", but means at least a portion thereof around a weld zone has a thickness less than that of "another component".

In the welded structure according to the first embodiment, the upper bracket 5 is formed with a plurality of (in the first embodiment, four) circular-shaped positioning concave portions 5a concaved in a direction from an outer surface to an inner surface thereof (see FIG. 4B). Correspondingly, a base section 15b of the spring-retaining bracket 15 is formed with a plurality of circular-shaped positioning convex portions 15a fittable into respective ones of the positioning concave portions 5a of the upper bracket 5 (see FIG. 4B).

The base section 15b of the spring-retaining bracket 15 is brought into contact with the outer surface of the positioning concave portions 5a, while fittingly inserting the positioning convex portions 15a of the spring-retaining bracket 15 into respective ones of the positioning concave portions 5a of the upper bracket 5.

Conventionally, in this state, a front end 15c and a rear end 15d of the base section 15b of the spring-retaining bracket 15 are arc-welded to the outer surface of the upper bracket 5 to lay two weld beads (weld areas) a, b, as illustrated in FIG. 2. However, in an operation durability test (against a repetitive load caused when the side frame 11 is repetitively swingingly moved about the reclining shaft 6), it has been found that a fatigue crack c is likely to occur in a region of the outer surface of the upper bracket 5 around the weld bead b, after about 75% of a prescribed number of repetitions. This is caused by a phenomenon that stress due to a spring force P of the spiral spring (forwardly biasing spring) acting on the spring-retaining bracket 15 is concentrated on a specific one b of the weld beads.

Therefore, the present invention is directed to determining in which of the weld beads stress concentration occurs, and applying, to the determined weld bead b, a countermeasure for suppressing the occurrence of fatigue crack.

Specifically, as illustrated in FIGS. 3A to 4B, two of the positioning concave portions 5a of the upper bracket 5 located at frontmost and rearmost positions are firstly arc-welded, respectively, to two of the positioning convex portions 15a of the spring-retaining bracket 15 located at frontmost and rearmost positions, from the side of the inner surface of the upper bracket 5, to lay two weld beads d, e.

Then, according to a durability test or a simulation based on structural calculation or the like, a stress direction and level in the weld bead e, subject to stress concentration is preliminarily verified.

Then, based on a result of the verification, a stress-dispersing weld bead f is laid to extend between the weld bead e and the inner surface of the upper bracket 5 (inner panel 11a), in such a manner that a direction and length thereof are set to allow stress to be dispersed to the upper bracket (thin plate component) 5 so as to avoid stress concentration in the weld bead e, thereby preventing fatigue crack from occurring in the upper bracket 5.

In the case where the direction and length of the stress-dispersing weld bead f are set based on a durability test, the durability test may be repeatedly carried out using a plurality of test frame structures 1 prepared while changing a direction and length of the stress-dispersing weld bead f, and a combination of direction and length providing an optimal result may be selected.

Figure 4A:
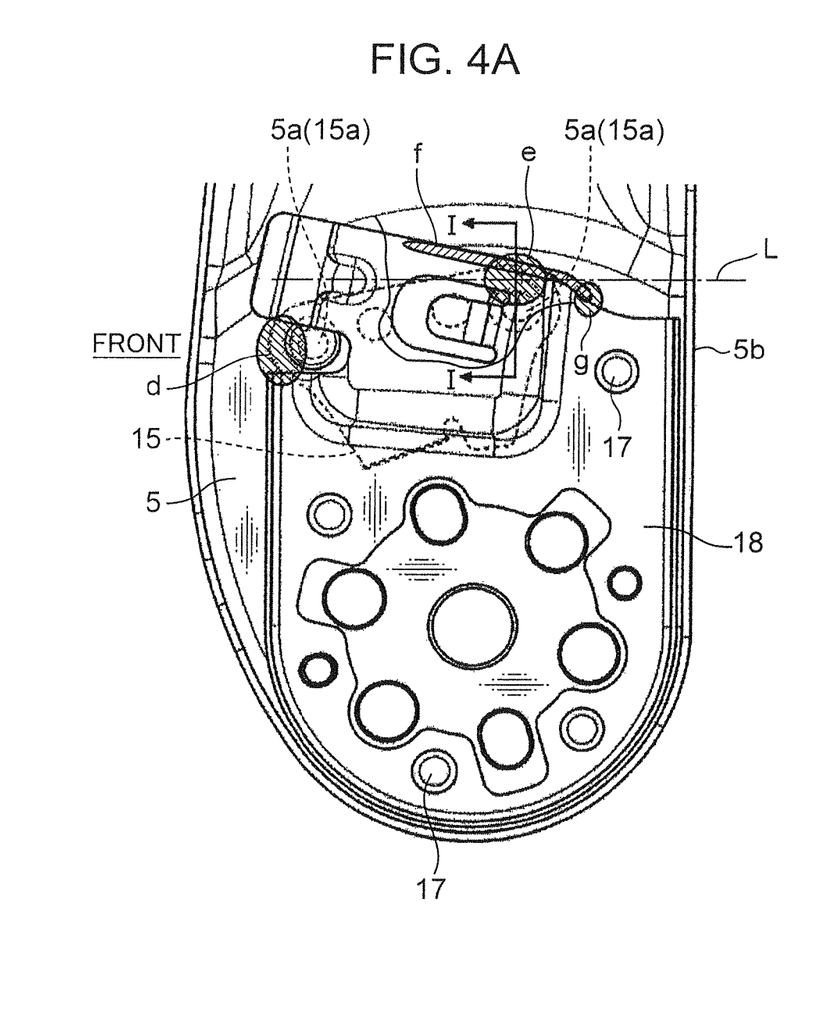
FIG. 4A is a fragmentary enlarged view of the welded structure in FIG. 3A.
Figure 4B:
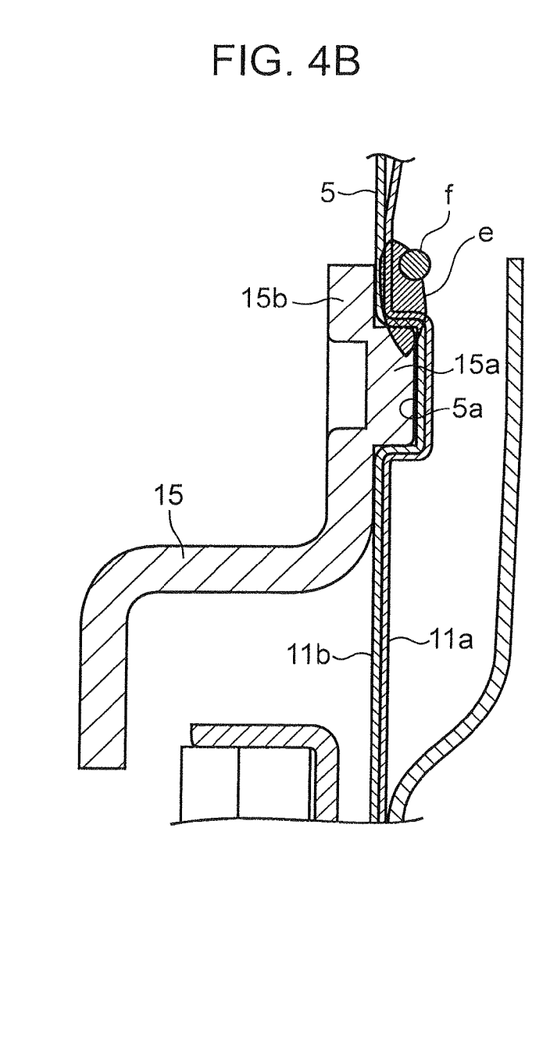
FIG. 4B is an enlarged sectional view taken along the line I-I in FIG. 4A.

In the welded structure between the upper bracket 5 of the side frame 11 and the spring-retaining bracket 15 as in the first embodiment, it is most appropriate that the stress-dispersing weld bead f is formed to intersect with the weld bead e and extend beyond the weld bead e in each of a forward direction and a rearward direction by about 20 mm, with an inclination angle of about 15 degree with respect to a line L perpendicular to a vertical rear edge 5b of the upper bracket 5, as illustrated in FIG. 4A.

It is preferable that the front weld bead d is laid to partially overlap with an edge of a reinforcing plate 18 fixed to the inner surface of the upper bracket 5 by a plurality of crimping pins 17, and further a weld bead g is laid on a rear end of the stress-dispersing weld bead f by arc-welding to allow the rear end to overlap with the edge of the reinforcing plate 18.

As above, in the welded structure between the upper bracket 5 of the side frame 11 and the spring-retaining bracket 15, according to a simulation based on a durability test or the like using a frame structure in which the spring-retaining bracket 15 is arc-welded to the upper bracket 5 discontinuously at several positions to lay several weld beads d, e, a stress direction and level in a weld bead e located at an area subject to stress concentration is preliminarily verified.

Then, based on a result of the verification, a stress-dispersing weld bead f is laid to extend between the weld bead e located at an area subject to stress concentration and the upper bracket 5, in such a manner that a direction and length thereof are set to prevent fatigue crack from occurring in the upper bracket 5 of the side frame 11.

This makes it possible to effectively achieve prevention of the occurrence of fatigue crack in the upper bracket 5 of the side frame 11, or delay in an occurrence timing of the fatigue crack, based on the reinforcing effect of the stress-dispersing weld bead f, while avoiding a situation where the stress-dispersing weld bead f is uselessly laid in a less effective direction or at a less effective length.

In addition, the stress-dispersing weld bead f can be laid, following a process of arc-welding the spring-retaining bracket 15 to the upper bracket 5 of the side frame 11 discontinuously at several positions. Thus, the operation process of laying the stress-dispersing weld bead f falls within the range of a usual welding operation process and requires no special technique, so that there is almost no increase in cost. Furthermore, it is only necessary to simply lay the stress-dispersing weld bead f, so that there is almost no increase in weight of the frame structure (welded structure) 1.

Meanwhile, there are other ways to prevent the occurrence of fatigue crack in a thin plate component. However, for example, in an approach of reducing a design stress, it is unable to utilize strength inherent in a plate-shaped steel plate, and a thick plate is liable to be used for reducing stress, which leads to an increase in weight of a welded structure. In an approach of changing a shape using a reinforcing member to locally reduce stress around a weld zone, the reinforcement using the reinforcing member leads to an increase in cost and weight of a welded structure. In an approach of subjecting a weld bead to finishing to control a shape of the weld bead to reduce stress concentration, operations for the finishing and verification of the shape lead to an increase in cost.

Furthermore, the positioning convex portions 15a of the spring-retaining bracket 15 are fittingly inserted into respective ones of the positioning concave portions 5a of the upper bracket 5, and then the spring-retaining bracket 15 is simply arc-welded to the upper bracket 5 in a discontinuous manner. This makes it possible to reliably hold the spring-retaining bracket 15 so as not to be lifted up by a spring force, even if weld areas are few in number.

In the conventional welded structure illustrated in FIG. 2, the vicinity of the weld bead a is a so-called "breathing area" (corresponding to an anti-node where the amplitude of vibration is greatest or maximized). In the first embodiment, the weld bead a is eliminated (restraint by the weld bead a is released) to allow the upper bracket 5 to be decoupled from a stress transfer path.

The first embodiment illustrated in FIGS. 3A to 4B relates to the welded structure between the upper bracket 5 and the spring-retaining bracket 15. Alternatively, the present invention may be applied to a welded structure between the upper bracket 5 and the reinforcing member 12, as in a second embodiment illustrated in FIGS. 6A to 7.

Figure 5A:
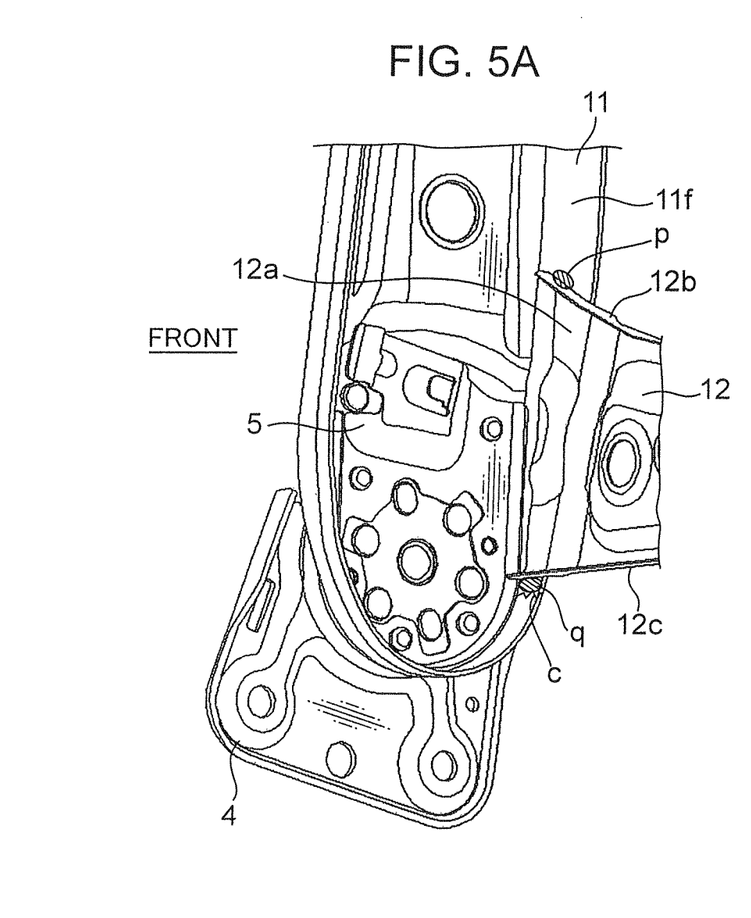
FIG. 5A is a perspective view of an obverse-side welded structure.
Figure 5B:
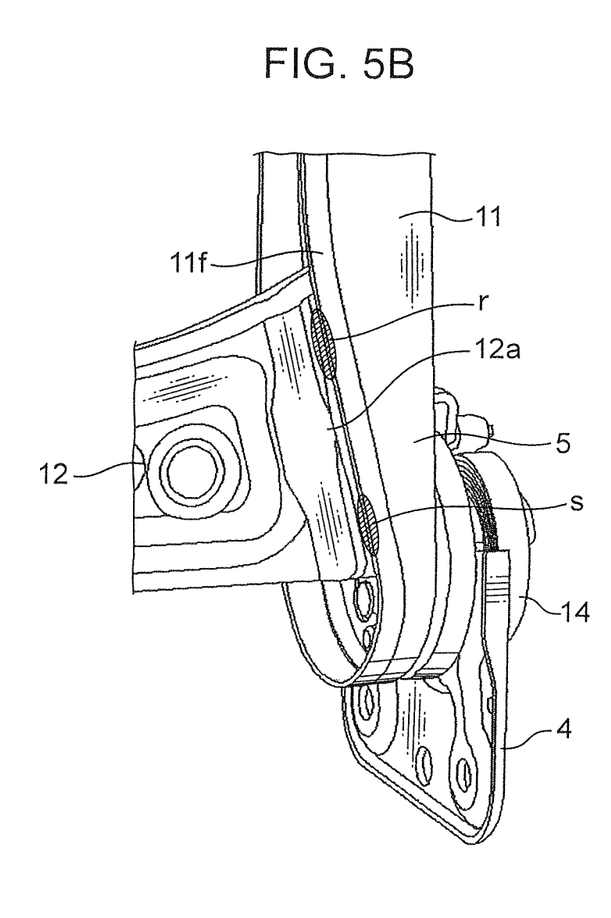
FIG. 5B is a perspective view of a reverse-side welded structure.

Specifically, as illustrated in FIGS. 5A and 5B, each of right and left ends 12a of the reinforcing member 12 is brought into contact with an obverse surface of a laterally protruding portion 11f of a respective one of the right and left side frames 11. In the second embodiment, the side frame 11 falls into the concept of the term "thin plate component (thin metal component)", and the reinforcing member 12 falls into the concept of the term "another component (another metal component)".

The terms "thin plate component" and "another component" are recited, respectively, as "first component" and "second component" in the appended claims. In this connection, it should be noted that, as used in this specification, the term "thin plate component (first component)" does not mean the entirety thereof essentially has a thickness less than that of "another component (second component)", but means at least a portion thereof around a weld zone has a thickness less than that of "another component".

Conventionally, in this state, an upper flange 12b and a lower flange 12c of the reinforcing member 12 are arc-welded to the laterally protruding portion 11f of the upper bracket 5 to lay two weld beads (weld areas) p, q, as illustrated in FIG. 5A as viewed from an obverse side. Furthermore, each of the right and left ends 12a of the reinforcing member 12 is arc-welded to the laterally protruding portion 11f of the upper bracket 5 from the side of a reverse surface of the laterally protruding portion 11f, to lay two upper and lower weld beads (weld areas) r, s. However, in an operation durability test (against a repetitive load to be input into the seat back when an occupant repetitively leans thereon), it has been found that a fatigue crack c is likely to occur in the laterally protruding portion 11f of the upper bracket 5 around the weld bead q, after about 25% of a prescribed number of repetitions. This is caused by a phenomenon that stress due to a load of a seated person acting on the reinforcing member 12 is concentrated on a specific one q of the weld beads.

Therefore, the present invention is directed to determining in which of the weld beads stress concentration occurs, and applying, to the determined weld bead q, a countermeasure for suppressing the occurrence of fatigue crack.

Figure 7:
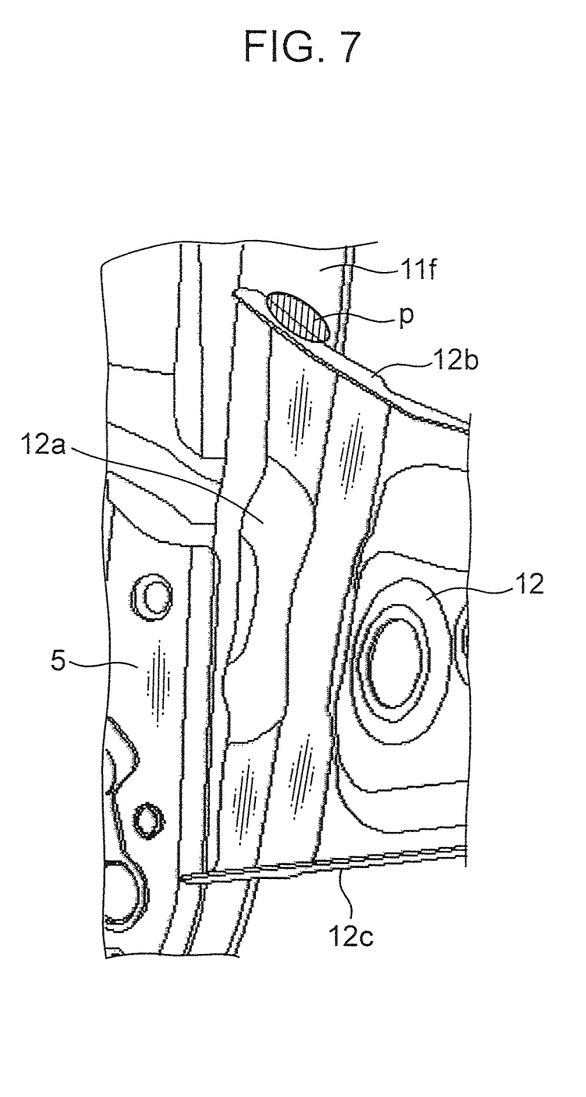
FIG. 7 is a fragmentary perspective view of an obverse-side welded structure between an upper bracket and a reinforcing member, according to the second embodiment of the present invention.

Specifically, as illustrated in FIG. 7, the weld bead q of the lower flange 12c located at an area subject to stress concentration is eliminated, and only the weld bead p of the upper flange 12b is left. Then, according to a durability test or a simulation based on structural calculation or the like, a stress direction and level in the weld bead s located at an area subject to stress concentration is preliminarily verified.

Figure 6A:
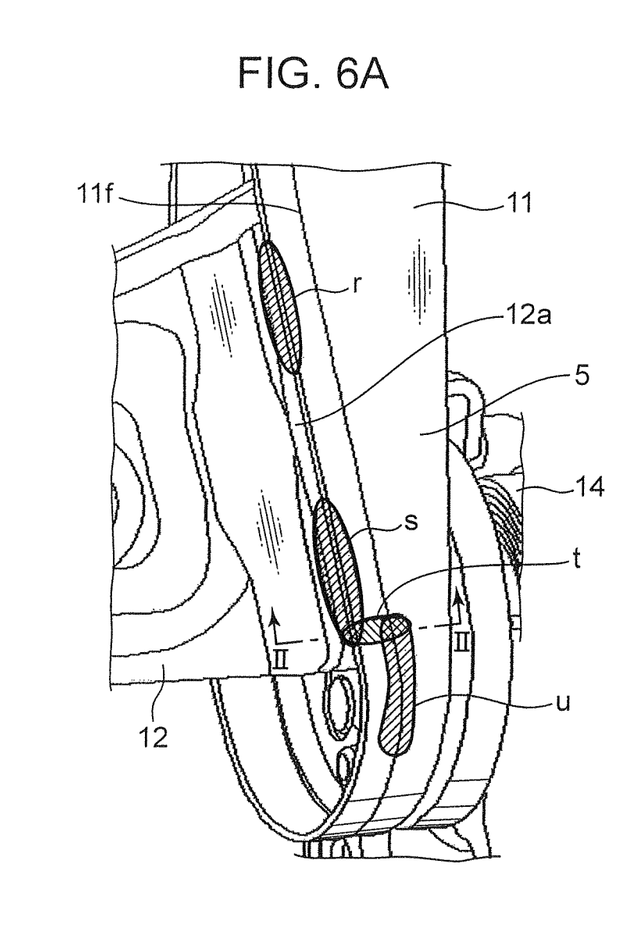
FIG. 6A is a fragmentary perspective view of a reverse-side welded structure.
Figure 6B:
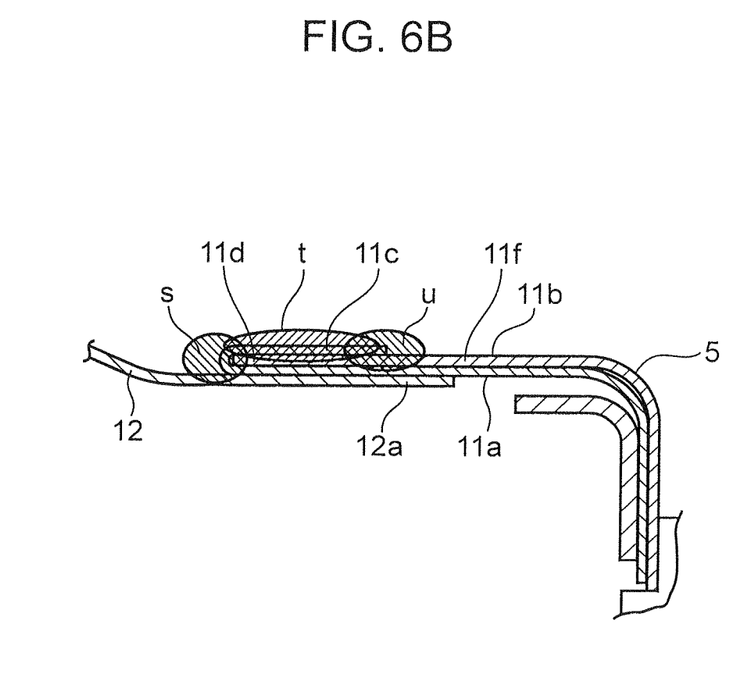
FIG. 6B is an enlarged sectional view taken along the line II-II in FIG. 6A.

Then, based on a result of the verification, as illustrated in FIGS. 6A and 6B, two stress-dispersing weld beads t, u are laid to extend between the weld bead s and the reverse surface of the upper bracket (thin plate component) 5, in such a manner that a direction and length thereof are set to allow stress to be dispersed to the upper bracket 5 so as to avoid stress concentration in the weld bead s, thereby preventing fatigue crack from occurring in the upper bracket (thin plate component) 5.

In the case where the direction and length of each of the stress-dispersing weld beads t, u are set based on a durability test, the durability test may be repeatedly carried out using a plurality of test frame structures 1 prepared while changing a direction and length of each of the stress-dispersing weld beads t, u, and a combination of direction and length providing an optimal result may be selected.

In the operation of laying the stress-dispersing weld beads t, u, the stress-dispersing weld bead t is laid to overlap with a lower end of the weld bead s and extend in an outward direction approximately perpendicular to the weld bead s. Then, the stress-dispersing weld bead u is laid to overlap with an outer end of the stress-dispersing weld bead t and extend in a downward direction approximately perpendicular to the stress-dispersing weld bead t and along a stepped portion between the inner panel 11a and the outer panel 11b. Alternatively, the stress-dispersing weld bead t may be inclined at about 45 degrees with respect to each of the stress-dispersing weld beads s, u.

In the welded structure between the upper bracket 5 of the side frame 11 and the reinforcing member 12 as in the second embodiment, it is most appropriate that the stress-dispersing weld bead t is formed to extend outwardly at a length of about 10 mm, and the stress-dispersing weld bead u is formed to extend downwardly at a length of about 15 mm, as illustrated in FIG. 6A, As above, in the welded structure between the upper bracket 5 of the side frame 11 and the reinforcing member 12, according to a simulation based on a durability test or the like using a frame structure in which the reinforcing member 12 is arc-welded to the upper bracket 5 of the side frame 11 discontinuously at several positions to lay several weld beads p, r, s, a stress direction and level in a weld bead s located at an area subject to stress concentration is preliminarily verified.

Then, based on a result of the verification, two stress-dispersing weld beads t, u are laid to extend between the weld bead s located at an area subject to stress concentration and the upper bracket 5, in such a manner that respective directions and lengths thereof are set to prevent fatigue crack from occurring in the upper bracket 5.

This makes it possible to effectively achieve prevention of the occurrence of fatigue crack in the upper bracket 5 of the side frame 11, or delay in an occurrence timing of the fatigue crack, based on the reinforcing effect of the stress-dispersing weld beads t, u, while avoiding a situation where each of the stress-dispersing weld beads t, u is uselessly laid in a less effective direction or at a less effective length.

In addition, the stress-dispersing weld beads t, u can be laid, following a process of arc-welding the reinforcing member 12 to the upper bracket 5 of the side frame 11 discontinuously at several positions. Thus, the operation process of laying the stress-dispersing weld beads t, u falls within the range of a usual welding operation process and requires no special technique, so that there is almost no increase in cost. Furthermore, it is only necessary to simply lay the stress-dispersing weld beads t, u, so that there is almost no increase in weight of the frame structure (welded structure) 1.

In the conventional welded structure illustrated in FIGS. 5A and 5B, the vicinity of the weld bead q is a so-called "breathing area" (corresponding to an anti-node where the amplitude of vibration is greatest or maximized). In the second embodiment, the weld bead q is eliminated (restraint by the weld bead q is released) to allow the upper bracket 5 to be decoupled from a stress transfer path.

In particular, the stress-dispersing weld beads t, u may be formed as a statically-indeterminate beam to ensure fastening strength (weld strength) and form a node of vibration. This makes it possible to avoid a situation where the fastened area (weld area) becomes an "anti-node of the vibration", to allow the upper bracket 5 to be elastically deformed as a whole, thereby effectively preventing the occurrence of fatigue crack in the upper bracket 5 of the side frame 11.

Figure 8A:
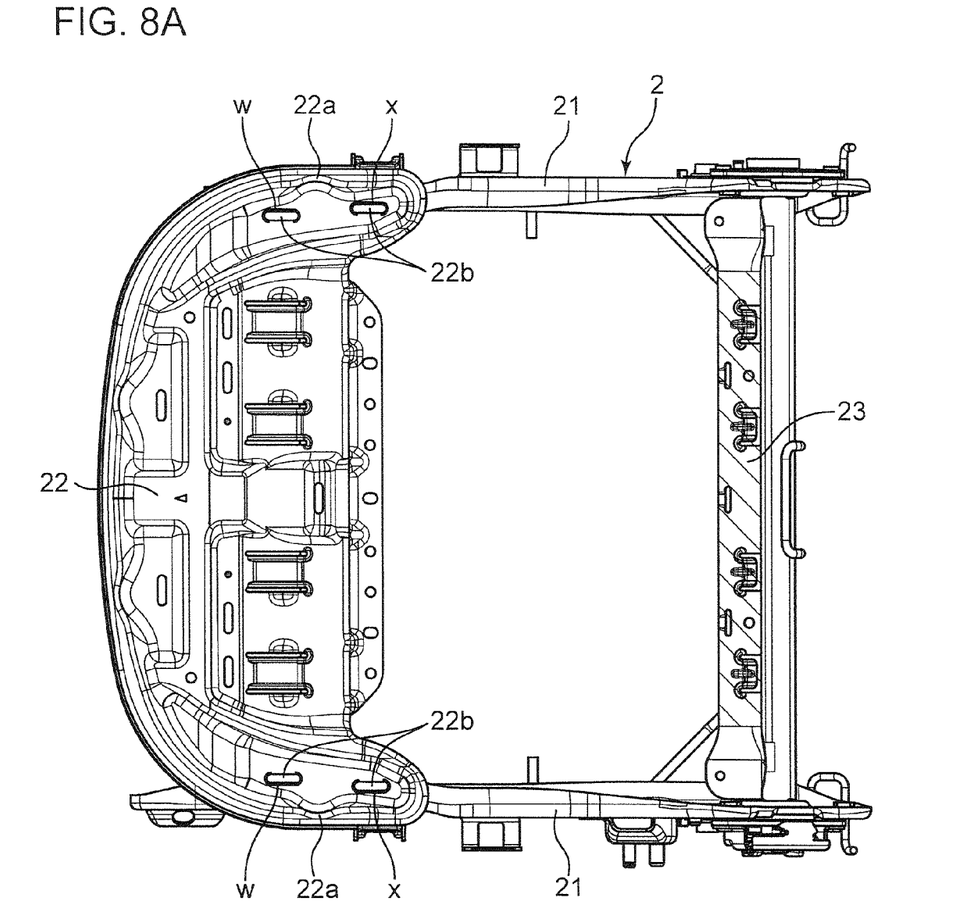
FIG. 8A is a top plan view.
Figure 9A:
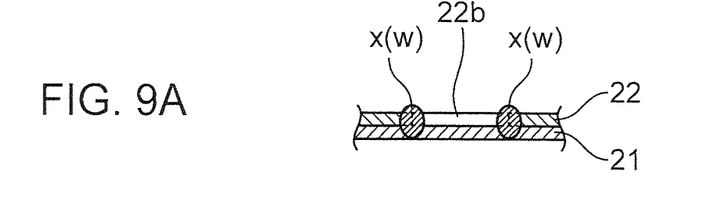
FIG. 9A is an enlarged sectional view taken along the line III-III in the following FIG. 9B.
Figure 9B:
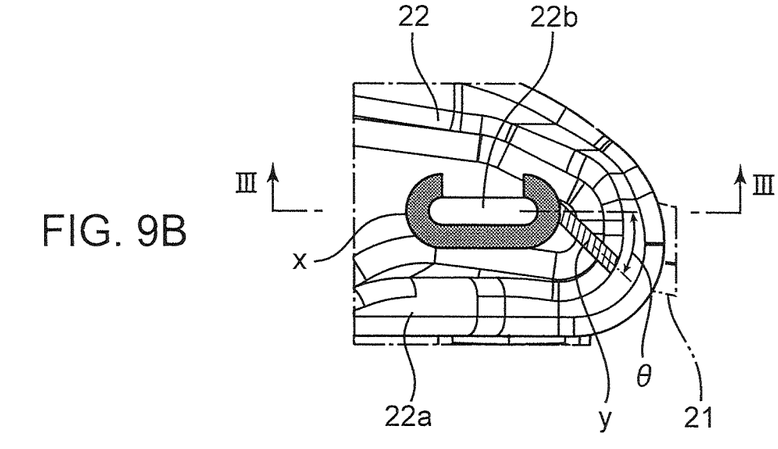
FIG. 9B is a fragmentary enlarged view of the welded structure illustrated in FIG. 8A.
Figure 9C:
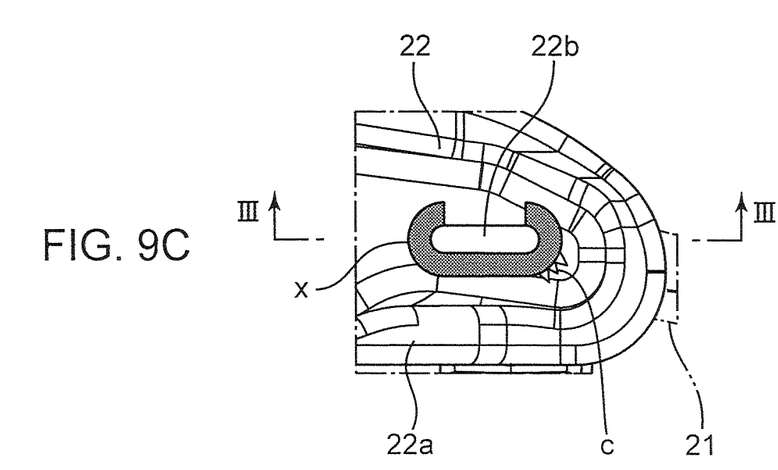
FIG. 9C is a fragmentary enlarged view of a conventional welded structure between a side frame and a cushion pan, corresponding to FIG. 8A.

Alternatively, the present invention may be applied to a welded structure between an afterementioned side frame 21 and an aftermentioned cushion pan 22 of the cushion frame 2, as in a third embodiment illustrated in FIGS. 8A to 9 C.

The cushion frame 2 comprises a front section composed of a cushion pan (front reinforcing member) 22, and a side section composed of right and left side frames 21 each having an upper portion arc-welded to a respective one of right and left regions of a front bottom portion of the cushion pan 22, and a rear section composed of a reinforcing member 23 arc-welded between respective rear ends of the right and left side frames 21.

Each of the cushion pan 22 and the reinforcing member 23 is a press-formed product reinforced by a concavoconvex rib configuration. Each of the side frames 21 is formed using one thick plate. In the third embodiment, the side frame 21 falls into the concept of the term "another component (another metal component)".

Figure 8B:
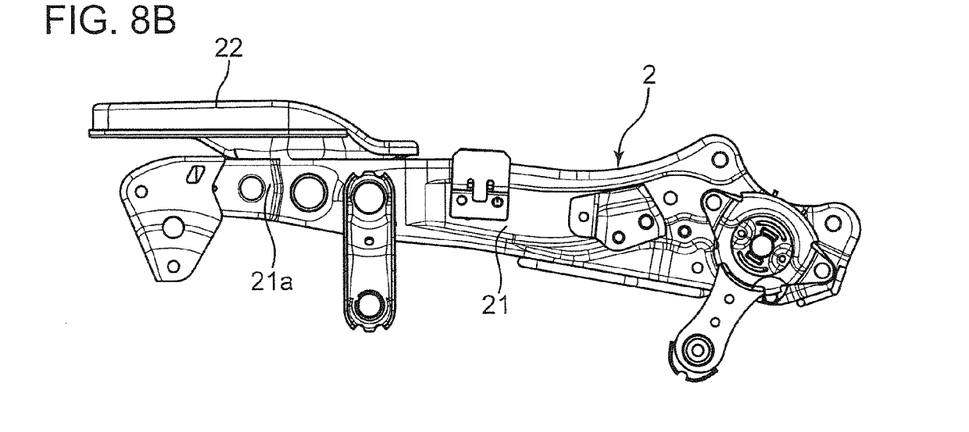
FIG. 8B is a side view.

As illustrated in FIGS. 8A and 8B, a lower surface of the cushion pan 22 adjacent to each of right and left ends 22a thereof is brought into contact with an upper surface of a front end 21a of a respective one of the right and left side frames 21. In the third embodiment, the cushion pan 22 falls into the concept of the term "thin plate component (thin metal component)".

The terms "thin plate component" and "another component" are recited, respectively, as "first component" and "second component" in the appended claims. In this connection, it should be noted that, as used in this specification, the term "thin plate component (first component)" does not mean the entirety thereof essentially has a thickness less than that of "another component (second component)", but means at least a portion thereof around a weld zone has a thickness less than that of "another component".

The cushion pan 22 has total four holes 22b two of which are formed at positions adjacent to a respective one of the right and left ends 22a thereof, wherein each of the holes 22b is formed in an elongate shape in the forward-rearward direction.

Conventionally, in this state, a periphery of each of the holes 22b of the cushion pan 22 is arc-welded to the front end 21a of the side frame 21 in a generally C shape to lay a weld bead (weld areas) (w, x), as illustrated in FIG. 9C which is a top plan view, and FIG. 9A which is a sectional view taken along the line III-III in FIG. 9C. However, in an operation durability test (against a repetitive test to be input into the cushion pan when an occupant repetitively operates a brake pedal or the like), it has been found that a fatigue crack c is likely to occur in an upper surface of the cushion pan 22 around each of the rear weld beads x, after about 60% of a prescribed number of repetitions. This is caused by a phenomenon that stress due to a load of a seated person acting on the cushion pan 22 is concentrated on a specific one x of the weld beads.

Therefore, the present invention is directed to determining in which of the weld beads stress concentration occurs, and applying, to the determined weld bead x, a countermeasure for suppressing the occurrence of fatigue crack.

Specifically, according to a durability test or a simulation based on structural calculation or the like, a stress direction and level in the weld bead x located at an area subject to stress concentration is preliminarily verified Then, based on a result of the verification, as illustrated in FIG. 9B, a stress-dispersing weld bead y is laid to extend between the weld bead x and the upper surface of the cushion pan (thin plate component) 22, in such a manner that a direction and length thereof are set to allow stress to be dispersed to the cushion pan 22 so as to avoid stress concentration in the weld bead x, thereby preventing fatigue crack from occurring in cushion pan (thin plate component) 22.

In the case where the direction and length of the stress-dispersing weld bead y are set based on a durability test, the durability test may be repeatedly carried out using a plurality of test frame structures 1 prepared while changing a direction and length of the stress-dispersing weld bead y, and a combination of direction and length providing an optimal result may be selected.

In the operation of laying the stress-dispersing weld bead y, the stress-dispersing weld bead y is laid to allow a base end thereof to overlap with a corner portion of the weld bead x, and then extend outwardly with an inclination.

In the welded structure between the side frame 21 and the cushion pan 22 as in the third embodiment, it is most appropriate that the stress-dispersing weld bead y is formed to extend outwardly at a length of about 20 mm with an inclination angle θ of about 45 degrees with respect to the forward-rearward direction, as illustrated in FIG. 9B.

As above, in the welded structure between the side frame 21 and the cushion pan 22, according to a simulation based on a durability test or the like using a frame structure in which the cushion pan 22 is arc-welded to the front end 21a of the side frame 21 discontinuously at several positions through the hole 22b to lay the weld bead (w, x), a stress direction and level in a weld bead x located at an area subject to stress concentration is preliminarily verified.

Then, based on a result of the verification, a stress-dispersing weld bead y is laid to extend between the weld bead x located at an area subject to stress concentration and the cushion pan 22, in such a manner that a direction and lengths thereof are set to prevent fatigue crack from occurring in the cushion pan 22.

This makes it possible to effectively achieve prevention of the occurrence of fatigue crack in the cushion pan 22, or delay in an occurrence timing of the fatigue crack, based on the reinforcing effect of the stress-dispersing weld bead y, while avoiding a situation where the stress-dispersing weld bead y is uselessly laid in a less effective direction or at a less effective length.

In addition, the stress-dispersing weld bead y can be laid, following a process of arc-welding the cushion pan 22 to the side frame 21 discontinuously at several positions. Thus, the operation process of laying the stress-dispersing weld bead y falls within the range of a usual welding operation process and requires no special technique, so that there is almost no increase in cost. Furthermore, it is only necessary to simply lay the stress-dispersing weld bead y, so that there is almost no increase in weight of the frame structure (welded structure) 1.

Outline of Embodiments

The present invention provides a method of producing a thin plate-reinforcement structure utilizing a reinforcing effect of a weld bead. The method comprises: a first step of preparing a first component including a thin plate portion, and a second component having a thickness greater than that of the thin plate portion; and a second step of welding the first component and the second component together. The second step includes the sub-steps of: welding the first component and the second component together through at least one weld area; and providing a stress-dispersing weld bead to extend from an overlapping region between the weld area and the first component, onto the first component or the second component, wherein the stress-dispersing weld bead is set to a direction and length capable of preventing fatigue crack from occurring in the first component.

The present invention further provides a thin plate-reinforcement structure utilizing a reinforcing effect of a weld bead. The thin plate-reinforcement structure comprises: a first component including a thin plate portion; and a second component having a thickness greater than that of the thin plate portion. The first component and the second component are welded together through at least one weld area, and a stress-dispersing weld bead is provided to extend from an overlapping region between the weld area and the first component, onto the first component or the second component, wherein the stress-dispersing weld bead is set to a direction and length capable of preventing fatigue crack from occurring in the first component.

In the present invention, during an operation of welding a thin plate component (hereinafter referred to also as "first component") and another component (hereinafter also referred to as "second component"), the stress-dispersing weld bead is provided to extend from an overlapping region between a weld area located at an area subject to stress concentration and the thin plate component (first component), onto the first or second component. This makes it possible to effectively achieve prevention of the occurrence of fatigue crack in the thin plate component, or delay in an occurrence timing of the fatigue crack.

In addition, the stress-dispersing weld bead can be laid, following the operation process of welding, to the thin plate component (first component), another component (second component). Thus, the operation process of laying the stress-dispersing weld bead falls within the range of a usual welding operation process and requires no special technique, so that there is almost no increase in cost. Furthermore, it is only necessary to simply lay the stress-dispersing weld bead, so that there is almost no increase in weight of a welded structure.

In one embodiment of the present invention, the stress-dispersing weld bead set to a direction and length capable of preventing fatigue crack from occurring in the first component may be laid to extend between the weld area and the first component, wherein the weld area is located at a position where an amplitude of vibration caused by a repetitive load input into the first component is approximately maximized. The term "repetitive load" here means a repetitive load in each of the aforementioned three types of operation durability tests: the durability test against a repetitive load to be input into the spring-retaining bracket 15 when the side frame 11 is repetitively swingly moved about the reclining shaft 6; the durability test against a repetitive load to be input into the seat back when an occupant repetitively leans thereon; and the durability test against a repetitive load to be input into the cushion pad when an occupant repetitively operates a brake pedal or the like. The term "repetitive load" also means a load to be repetitively input by an occupant during a normal usage state, in the similar manner to that in each of the operation durability tests. This makes it possible to lay the stress-dispersing weld bead set to a direction and length capable of preventing fatigue crack from occurring in the first (thin plate) component to extend between the weld area located at a position where an amplitude of vibration caused by a repetitive load input into the first component is approximately maximized, and the first (thin plate) component, usefully and effectively.

In another embodiment of the present invention, when the number of the weld areas is two or more, the stress-dispersing weld bead is not laid in one or more of the weld areas, wherein each of the one or more weld areas is located at a position where an amplitude of vibration caused by a repetitive load input into the first component is approximately maximized.

In this case, the weld area having an approximately maximum amplitude of vibration caused by the repetitive load is so-called "breathing area" (corresponding to an anti-node of the vibration), and no weld bean is laid on this weld area (accurately, an area which would otherwise be subjected to welding (welding area)), i.e., a weld bead is eliminated to release restraint thereby). This makes it possible to while avoid a situation where the welding area becomes a "node of the vibration" to allow the first (thin plate) component to be elastically deformed as a whole, thereby effectively preventing the occurrence of fatigue crack in the first (thin plate) component. The term "node of vibration" means a position where an amplitude of the vibration is smallest or minimized (antonym of "anti-node of vibration").

In yet another embodiment of the present invention, when: the first component is right and left side frames 11 of a back frame 3 to be installed inside a seat back of an automobile seat, wherein each of the right and left side frames is composed of two superimposed plates; and the second component is a spring-retaining bracket 15 to be arc-welded to an upper bracket 5 of one of the right and left side frames 11 so as to retain a spring 14 for biasing the seat back forwardly, it is preferable that: the spring-retaining bracket 15 is brought into contact with an outer surface of the upper bracket 5, and arc-welded to the upper bracket 5 from the side of an inner surface of the upper bracket 5; and the stress-dispersing weld bead (f) is provided to extend from an overlapping region between the weld area and the inner surface of the upper bracket 5, onto the side frame 11, wherein the weld area is located at an area subject to stress concentration.

In this case, even if stress due to a spring force of the forwardly biasing spring 14 acting on the spring-retaining bracket 15 is concentrated on a specific weld area, the stress will be dispersed to the upper bracket 5 of the side frame 11 through the stress-dispersing weld bead (f). This makes it possible to effectively achieve prevention of the occurrence of fatigue crack in a specific weld area of the upper bracket 5 of the side frame 11, or delay in an occurrence timing of the fatigue crack.

More preferably, in the above embodiment, the upper bracket 5 is formed with a positioning concave portion 5a concaved in a direction from the outer surface to the inner surface thereof, and the spring-retaining bracket 15 is formed with a positioning convex portion 15a fittable into the positioning concave portion, wherein the weld area (e) is formed by arc-welding the positioning concave portion 5a of the upper bracket and the positioning convex portion 15a of the spring-retaining bracket together.

In the thin plate-reinforcement structure, the arc-welding the positioning concave portion 5a of the upper bracket and the positioning convex portion 15a of the spring-retaining bracket may be arc-welded together.

In this case, the positioning convex portion 15a of the spring-retaining bracket is fitted into the positioning concave portion 5a of the upper bracket, and the fitted region is discontinuously arc-welded. Through this simple operation, it becomes possible to reliably hold the spring-retaining bracket so as not to be lifted up by the spring force, even if weld areas are few in number.

In still another embodiment of the present invention, when: the first component is right and left side frames 11 of a back frame 3 to be installed inside a seat back of an automobile seat, wherein each of the right and left side frames is composed of two superimposed plates; and the second component is a reinforcing member 12 to be bridgingly arc-welded to the right and left side frames 11, it is preferable that: each of right and left ends of the reinforcing member 12 is brought into contact with an obverse surface of a laterally protruding portion of a respective one of the right and left side frames 11, and arc-welded to the side frame 11 from the side of a reverse surface of the laterally protruding portion of the side frame; and the stress-dispersing weld bead (t, u) is formed to extend from an overlapping region between the weld area which is an area subject to a stress concentration and the reverse surface of the side frame 11, onto the side frame 11.

In this case, even if stress due to an occupant's load acting on the reinforcing member 12 is concentrated on a specific weld area, the stress will be dispersed to the side frame 11 through the stress-dispersing weld bead. This makes it possible to effectively achieve prevention of the occurrence of fatigue crack in a specific weld area of the side frame 11, or delay in an occurrence timing of the fatigue crack.

In yet still another embodiment of the present invention, when the second component is right and left side frames 21 of a cushion frame to be installed inside a seat cushion of an automobile seat, and the first component is a cushion pan 22 to be bridgingly arc-welded to the right and left side frames 21, it is preferable that: a lower surface of the cushion pan 22 adjacent to each of right and left ends thereof is brought into contact with an upper surface of a respective one of the right and left side frames 21; a periphery of a hole 22a formed in a vicinity of each of the right and left ends of the cushion pan 22 is arc-welded to the upper surface of the respective one of the right and left side frames 21; and the stress-dispersing weld bead (y) is formed to extend from an overlapping region between the weld area which is an area subject to a stress concentration and the upper surface of the cushion pan 22, onto the cushion pan 22.

In this case, even if stress due to an occupant's load acting on the cushion pan 22 is concentrated on a specific weld area, the stress will be dispersed to the cushion pan 22 through the stress-dispersing weld bead. This makes it possible to effectively achieve prevention of the occurrence of fatigue crack in a specific weld area of the cushion pan 22, or delay in an occurrence timing of the fatigue crack.

EXPLANATION OF CODES

1: frame structure (welded structure)
3: back frame
5: upper bracket (first (thin plate) component)
5a: positioning concave portion
11: side frame (first (thin plate) component)
11a: inner panel
11b: outer panel
11f: laterally protruding portion
12: reinforcing member (second (another) component)
12a: end
14: spiral spring (forwardly biasing spring)
15: spring-retaining bracket (second (another) component)
15a: positioning convex portion
21: side frame (second (another) component)
22: cushion pan (first (thin plate) component)
22b: hole
e, s, x: weld bead (weld bead which is subject to stress concentration)
f, t, u, y: stress-dispersing weld bead This application is based on Japanese Patent Application Serial Nos. 2011-138278 and 2012-043325 filed in Japan Patent Office on Jun. 22, 2011 and Feb. 29, 2012, respectively, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A method of producing a thin plate-reinforcement structure utilizing a reinforcing effect of a weld bead, comprising:
preparing a first component including a thin plate portion, and a second component having a thickness greater than that of the thin plate portion, the first component being right and left side frames of a back frame to be installed inside a seat back of an automobile seat and the first component having opposite first and second surfaces;
bringing the second component into contact with the first surface of the first component;
welding the first component and the second component together through at least two weld areas by arc-welding the second component to the first component from the second surface of the first component; and
providing a stress-dispersing weld bead to extend from an overlapping region between a weld area of the at least two weld area and the first component, onto the second surface of the first component, wherein the stress-dispersing weld bead is set to a direction and length capable of preventing fatigue crack from occurring in the first component.

2. The method as defined in claim 1, wherein the stress-dispersing weld bead set to a direction and length capable of preventing fatigue crack from occurring in the first component is laid to extend between the weld area and the first component, wherein the weld area is located at a position where an amplitude of vibration caused by a repetitive load input into the first component is approximately maximized.

3. The method as defined in claim 1, wherein the stress-dispersing weld bead is not laid in one or more of the weld areas, each of the one or more weld areas being located at a position where an amplitude of vibration caused by a repetitive load input into the first component is approximately maximized.

4. The method as defined in claim 1, wherein:
the first component is the right and left side frames of the back frame to be installed inside a seat back of an automobile seat, each of the right and left side frames being composed of two superimposed plates; and
the second component is a spring-retaining bracket to be arc-welded to an upper bracket of one of the right and left side frames so as to retain a spring for biasing the seat back forwardly, and
wherein:
the spring-retaining bracket is brought into contact with an outer surface as the first surface of the upper bracket, and arc-welded to the upper bracket from the side of an inner surface as the second surface of the upper bracket; and
the stress-dispersing weld bead is provided to extend from an overlapping region between the weld area which is an area subject to a stress concentration and the inner surface of the upper bracket, onto the side frame.

5. The method as defined in claim 4, wherein:
the upper bracket is formed with a positioning concave portion concaved in a direction from the outer surface to the inner surface thereof; and
the spring-retaining bracket is formed with a positioning convex portion fittable into the positioning concave portion, and
wherein the weld area is formed by arc-welding the positioning concave portion of the upper bracket and the positioning convex portion of the spring-retaining bracket together.

6. The method as defined in claim 1, wherein:
the first component is the right and left side frames of the back frame to be installed inside a seat back of an automobile seat, each of the right and left side frames being composed of two superimposed plates; and
the second component is a reinforcing member to be bridgingly arc-welded to the right and left side frames, and
wherein:
each of right and left ends of the reinforcing member is brought into contact with an obverse surface as the first surface of a laterally protruding portion of a respective one of the right and left side frames, and arc-welded to the side frame from the side of a reverse surface as the second surface of the laterally protruding portion of the side frame; and the stress-dispersing weld bead is formed to extend from an overlapping region between the weld area which is an area subject to a stress concentration and the reverse surface of the side frame, onto the side frame.

7. A thin plate-reinforcement structure utilizing a reinforcing effect of a weld bead, comprising:
a first component including a thin plate portion; and
a second component having a thickness greater than that of the thin plate portion, wherein:
the first component and the second component are welded together through at least one weld area, and a stress-dispersing weld bead is provided to extend from an overlapping region between the weld area and the first component, onto the first component or the second component, the stress-dispersing weld bead being set to a direction and length capable of preventing fatigue crack from occurring in the first component;
the second component is right and left side frames of a cushion frame to be installed inside a seat cushion of an automobile seat; and
the first component is the cushion pan to be bridgingly arc-welded to the right and left side frames;
a lower surface of the cushion pan adjacent to each of right and left ends thereof is brought into contact with an upper surface of a respective one of the right and left side frames;
a periphery of a hole formed in a vicinity of each of the right and left ends of the cushion pan is arc-welded to the upper surface of the respective one of the right and left side frames; and
the stress-dispersing weld bead is formed to extend from an overlapping region between the weld area which is an area subject to a stress concentration and the upper surface of the cushion pan, onto the cushion pan.

8. A thin plate-reinforcement structure utilizing a reinforcing effect of a weld bead, comprising:
a first component including a thin plate portion and having opposite first and second surfaces; and
a second component having a thickness greater than that of the thin plate portion,
wherein the first component and the second component are welded together through at least two weld areas by arc-welding the second component to the first component on the second surface of the first component in a state where the second component is brought into contact with the first surface of the first component, and a stress-dispersing weld bead is provided to extend from an overlapping region between a weld area of the at least two weld areas and the first component, onto the second surface of the first component, the stress-dispersing weld bead being set to a direction and length capable of preventing fatigue crack from occurring in the first component, and
wherein the first component is right and left side frames of a back frame to be installed inside a seat back of an automobile seat.

9. The thin plate-reinforcement structure as defined in claim 8, wherein:
the first component is the right and left side frames of the back frame to be installed inside a seat back of an automobile seat, each of the right and left side frames being composed of two superimposed plates; and
the second component is a spring-retaining bracket to be arc-welded to an upper bracket of one of the right and left side frames so as to retain a spring for biasing the seat back forwardly, and
wherein:
the spring-retaining bracket is brought into contact with an outer surface as the first surface of the upper bracket, and arc-welded to the upper bracket from the side of an inner surface as the second surface of the upper bracket; and
the stress-dispersing weld bead is provided to extend from an overlapping region between the weld area which is an area subject to a stress concentration and the inner surface of the upper bracket, onto the side frame.

10. The thin plate-reinforcement structure as defined in claim 9, wherein:
the upper bracket is formed with a positioning concave portion concaved in a direction from the outer surface to the inner surface thereof; and
the spring-retaining bracket is formed with a positioning convex portion fittable into the positioning concave portion, and
wherein the positioning concave portion of the upper bracket and the positioning convex portion of the spring-retaining bracket are arc-welded together.

11. The thin plate-reinforcement structure as defined in claim 8, wherein:
the first component is the right and left side frames of the back frame to be installed inside a seat back of an automobile seat, each of the right and left side frames being composed of two superimposed plates; and
the second component is a reinforcing member to be bridgingly arc-welded to the right and left side frames, and
wherein:
each of right and left ends of the reinforcing member is brought into contact with an obverse surface as the first surface of a laterally protruding portion of a respective one of the right and left side frames, and arc-welded to the side frame from the side of a reverse surface as the second surface of the laterally protruding portion of the side frame; and
the stress-dispersing weld bead is formed to extend from an overlapping region between the weld area which is an area subject to a stress concentration and the reverse surface of the side frame, onto the side frame.

* * * * *